United States Patent
Winter et al.

(10) Patent No.: US 10,549,462 B2
(45) Date of Patent: Feb. 4, 2020

(54) METHOD OF FORMING AN INTEGRAL MANIFOLD

(71) Applicant: REDFLOW R&D PTY. LTD., Brisbane QLD (AU)

(72) Inventors: Alexander Rudolf Winter, Queensland (AU); Thomas John, Queensland (AU)

(73) Assignee: REDFLOW R&D PTY. LTD., Queensland (AU)

( * ) Notice: Subject to any disclaimer, the term of this patent is extended or adjusted under 35 U.S.C. 154(b) by 398 days.

(21) Appl. No.: 15/328,353

(22) PCT Filed: Jul. 21, 2015

(86) PCT No.: PCT/AU2015/050410
§ 371 (c)(1),
(2) Date: Jan. 23, 2017

(87) PCT Pub. No.: WO2016/011503
PCT Pub. Date: Jan. 28, 2016

(65) Prior Publication Data
US 2017/0210045 A1    Jul. 27, 2017

(30) Foreign Application Priority Data

Jul. 21, 2014   (AU) ............................... 2014902806

(51) Int. Cl.
*B29C 45/14*   (2006.01)
*B29C 45/26*   (2006.01)
(Continued)

(52) U.S. Cl.
CPC .... *B29C 45/14336* (2013.01); *B29C 45/2628* (2013.01); *B29C 45/73* (2013.01);
(Continued)

(58) Field of Classification Search
None
See application file for complete search history.

(56) References Cited

U.S. PATENT DOCUMENTS

| 4,476,197 A | * | 10/1984 | Herceg | ............... H01M 8/2435 |
| | | | | 429/456 |
| 8,124,292 B2 | * | 2/2012 | Vitella | ............... H01M 8/0258 |
| | | | | 429/457 |

(Continued)

FOREIGN PATENT DOCUMENTS

| WO | 2002/025756 | 3/2002 |
| WO | 2008/116248 | 10/2008 |
| WO | 2010/020013 | 2/2010 |

OTHER PUBLICATIONS

International Search Report and Written Opinion from PCT/AU15/050410 dated Sep. 1, 2015.

*Primary Examiner* — Edmund H Lee
(74) *Attorney, Agent, or Firm* — Calfee, Halter & Griswold LLP (57) ABSTRACT

A method of forming an integral manifold adjacent a cell stack of a flowing electrolyte battery enables improved bonding of a molten material to the battery cell stack. The method includes defining a mould cavity adjacent the cell stack, with the mould cavity open to capillary openings of half cells of the cell stack; locating a plurality of pins in the mould cavity, with end regions of the pins being contiguous with the capillary openings; preheating the mould cavity by passing a fluid into a first end of the mould cavity and out of a second end of the mould cavity; and filling the mould cavity with molten material.

14 Claims, 6 Drawing Sheets

(51) Int. Cl.
  *B29C 45/73* (2006.01)
  *H01M 2/40* (2006.01)
  *H01M 8/18* (2006.01)
  *B29K 23/00* (2006.01)
  *B29K 105/00* (2006.01)
  *B29L 31/34* (2006.01)

(52) U.S. Cl.
  CPC ............ *H01M 2/40* (2013.01); *H01M 8/188* (2013.01); *B29K 2023/06* (2013.01); *B29K 2023/12* (2013.01); *B29K 2105/0067* (2013.01); *B29L 2031/3468* (2013.01)

(56) References Cited

U.S. PATENT DOCUMENTS

| | | | | |
|---|---|---|---|---|
| 8,580,457 B2 * | 11/2013 | Vitella | ................ | H01M 8/0247 429/510 |
| 2009/0004519 A1 * | 1/2009 | Vitella | ................ | H01M 8/0258 429/457 |
| 2009/0004547 A1 * | 1/2009 | Vitella | ................ | H01M 8/0247 429/457 |
| 2011/0104585 A1 | 5/2011 | DiCostanzo et al. | | |
| 2014/0093804 A1 | 4/2014 | Kreiner et al. | | |

* cited by examiner

FIG. 1

(PRIOR ART)

61. Forming a mould cavity adjacent a cell stack, with the mould cavity open to capillary openings of cells of the cell stack.

62. Locating a plurality of pins in the mould cavity, with end regions of the pins being contiguous with the capillary openings.

63. Pre-heating the mould cavity by passing a molten material into a first end of the mould cavity and out of a second end of the mould cavity.

64. Filling the mould cavity with molten material.

FIG. 6

METHOD OF FORMING AN INTEGRAL MANIFOLD

RELATED APPLICATIONS

The present application is the U.S. national phase entry of PCT/AU2015/050410, with an international filing date of Jul. 21, 2015, which claims the benefit of Australian Patent Application No. 2014902806, filed on Jul. 14, 2014, the entire disclosures of which are incorporated herein by reference.

FIELD OF THE INVENTION

The present invention relates to flowing electrolyte battery manifolds. In particular, although not exclusively, the invention relates to a method of forming an integral manifold for a cell stack of a flowing electrolyte battery.

BACKGROUND TO THE INVENTION

Batteries used in stand-alone power supply systems are commonly lead-acid batteries. However, lead-acid batteries have limitations in terms of performance and environmental safety. Typical lead-acid batteries often have very short lifetimes in hot climate conditions, especially when they are occasionally fully discharged. Lead-acid batteries are also environmentally hazardous, since lead is a major component of lead-acid batteries and can cause serious environmental problems during manufacturing and disposal.

Flowing electrolyte batteries, such as zinc-bromine batteries, zinc-chlorine batteries, and vanadium flow batteries, offer a potential to overcome the above mentioned limitations of lead-acid batteries. In particular, the useful lifetime of flowing electrolyte batteries is not affected by deep discharge applications, and the energy to weight ratio of flowing electrolyte batteries is up to six times higher than that of lead-acid batteries.

However, manufacturing flowing electrolyte batteries can be more difficult than manufacturing lead-acid batteries. A flowing electrolyte battery, like a lead acid battery, comprises a stack of cells to produce a certain voltage higher than that of individual cells. But unlike a lead acid battery, cells in a flowing electrolyte battery are hydraulically connected through an electrolyte circulation path. This can be problematic as shunt currents can flow through the electrolyte circulation path from one series-connected cell to another causing energy losses and imbalances in the individual charge states of the cells. To prevent or reduce such shunt currents, flowing electrolyte batteries define sufficiently long electrolyte circulation paths between cells, thereby increasing electrical resistance between cells.

Electrolyte is commonly supplied to, and discharged from a cell stack via external manifolds. Each cell has multiple inlets and outlets at capillary openings of the electrolyte circulation paths. Each external manifold is connected to the circulation paths of the cell stack using a delicate connection apparatus comprising an array of elastomer connection tubes. A typical 54-cell stack requires 216 elastomer connection tubes. Such a delicate connection apparatus is not only difficult to manufacture, but is also prone to damage during assembly and use. In order to reduce the likelihood of damage, internal manifolds formed within the casing of the battery have been developed in order to reduce the likelihood of damage.

Figure 1:
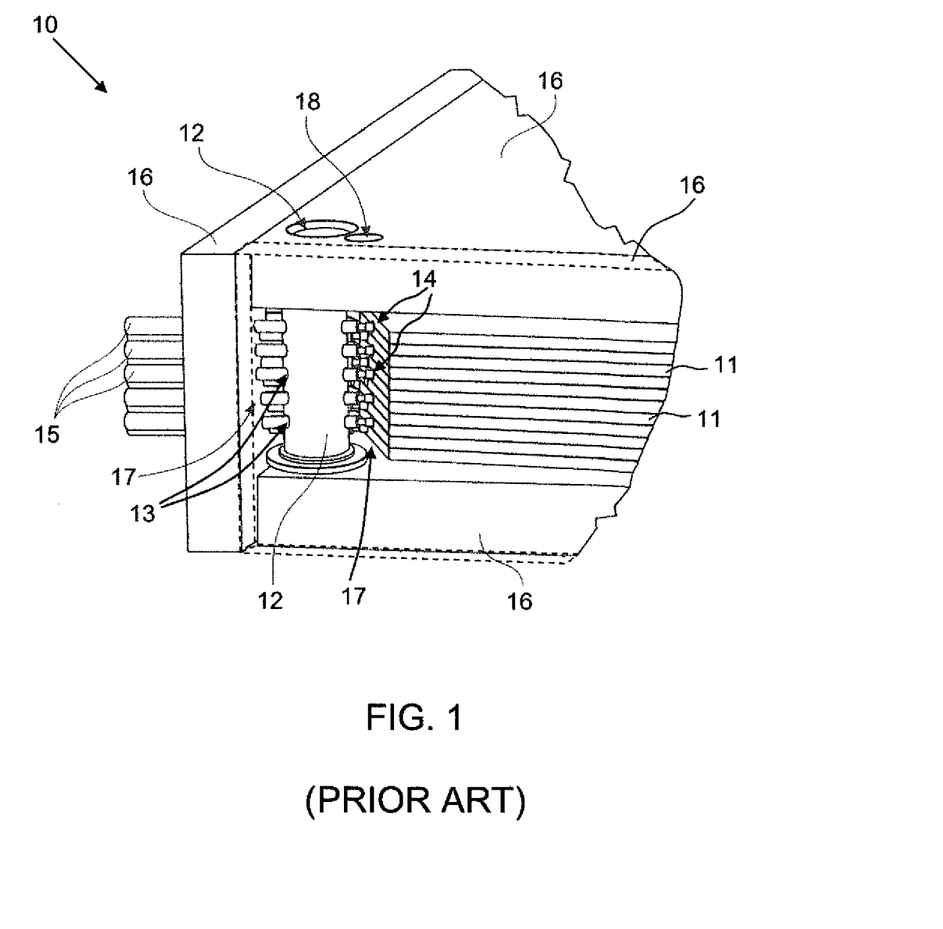
FIG. 1 is a diagram illustrating a partial perspective view of a flowing electrolyte battery constructed according to the prior art.

FIG. 1 illustrates a diagram of a partial perspective view of a battery 10 constructed according to the prior art. The battery 10 includes a stack of cells 11 and an integral manifold 12. The integral manifold 12 includes a plurality of holes 13 through the integral manifold 12 to the capillary openings 14. A formwork 16 is then constructed around the cells 11. Pins 15 pass through the formwork 16 and through each hole 13 to the capillary openings 14. Once the formwork 16 has been constructed, a mould material (not shown) is injected into a cavity 17 via a fill aperture 18. Once the mould material has set, the pins 15 and the formwork 16 are removed and the fill aperture 18 and holes formed by the pins 15 on an outside of the mould are then plugged, forming a fluid connection between the capillary openings 14 and the internal manifold 12. Fittings (not shown) are then connected to the integral manifold 12 via a seal for connecting to the electrolyte flow.

However, using the mould design illustrated in FIG. 1, a bond between the mould material and the stack of cells 11 is relatively weak and can be a source of leaks. In addition, another source of leaks can be a connection between the fittings and the seal for connecting to the electrolyte flow.

Further, the relatively high pressures used in prior art injection moulding can be problematic when moulding adjacent relatively delicate materials. Typical moulding parameters for normal high density polyethylene (HDPE) parts include temperatures from 230 to 260 degrees C. and pressures from 30 to 60 bar. For insert moulding, where a separate part which may be of different colour or even different material is positioned inside the mould before moulding takes place, the pressure must be higher or the inserted part will not bond with the injected plastic. Thus typical pressures for insert moulding are 50 to 70 bar, and temperatures will be at the higher end of the above range to improve bonding. However, in a flowing electrolyte battery cell stack, because such a large part of the mould is made up of the inserted parts, and these parts are made of soft, low strength, and porous plastics, the above pressures can deform the inserted parts.

There is therefore a need to overcome or alleviate many of the above discussed problems associated with flowing electrolyte batteries of the prior art.

OBJECT OF THE INVENTION

It is an object, of some embodiments of the present invention, to provide consumers with improvements and advantages over the above described prior art, and/or overcome and alleviate one or more of the above described disadvantages of the prior art, and/or provide a useful commercial choice.

SUMMARY OF THE INVENTION

According to one aspect, but not the only aspect, the invention comprises a method of forming an integral manifold adjacent a cell stack of a flowing electrolyte battery, the method including: defining a mould cavity adjacent the cell stack, with the mould cavity open to capillary openings of half cells of the cell stack; locating a plurality of pins in the mould cavity, with end regions of the pins being contiguous with the capillary openings; pre-heating the mould cavity by passing a molten material into a first end of the mould cavity and out of a second end of the mould cavity; and filling the mould cavity with molten material.

Preferably, the method further comprises: cooling the pins simultaneously during pre-heating of the mould cavity.

Preferably, the method further comprises: positioning a manifold core inside the mould cavity to define a manifold cavity, wherein the plurality of pins pass through the manifold core.

Preferably, the method further comprises: passing coolant fluid into a first end of the manifold core and out of a second end of the manifold core to cool the plurality of pins.

Preferably, the method further comprises: extending formwork above the cell stack to form a top port and extending formwork below the cell stack to form a bottom port.

Preferably, the molten material used during pre-heating is a same material as the molten material used during filling the mould cavity.

Preferably, a sprue and a gate are connected to the top port.

Preferably, the sprue is fluidly connected to the mould cavity and the gate is fluidly connected to the manifold cavity.

Preferably, an overflow well or a valve is connected to the second end of the mould cavity.

Preferably, the method further comprises: passing coolant fluid through the gate and into a first end of the manifold core and out of a second end of the manifold core to cool the plurality of pins; and wherein passing molten material into the first end of the mould cavity and out of the second end of the mould cavity comprises passing molten material into the sprue, through the mould cavity, and into the overflow well.

Preferably, passing coolant fluid through the gate and into a first end of the manifold core and out of a second end of the manifold core is performed simultaneously with passing the molten material into the first end of the mould cavity and out of the second end of the mould cavity.

Preferably, a pressure inside the mould cavity does not exceed 10 bar during pre-heating the mould cavity.

Preferably, a pressure inside the mould cavity does not exceed 30 bar during filling the mould cavity with molten material.

Preferably, during pre-heating the molten material passes out of the second end of the mould cavity for less than ten seconds.

Preferably, the method further comprises: cutting a sprue or gate from the first end of the mould cavity; and cutting an overflow well from the second end of the mould cavity.

According to another aspect, the present invention includes an integral manifold for a flowing electrolyte battery formed in accordance with the method described above.

Preferably, the capillary openings are defined at tube ends of capillary tubes which extend into the half cells.

Preferably, the pins have an outer end which is outside of the mould cavity as the molten material solidifies and an inner end which is received in the capillary opening.

Preferably, the outer end of a pin has a larger diameter than the inner end.

Preferably, the formwork has apertures defined therein, in which the pins are located when inserting the pins into the mould cavity.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

DETAILED DESCRIPTION OF THE INVENTION

Embodiments of the present invention comprise a method of forming an integral manifold adjacent a cell stack of a flowing electrolyte battery. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

Figure 2:
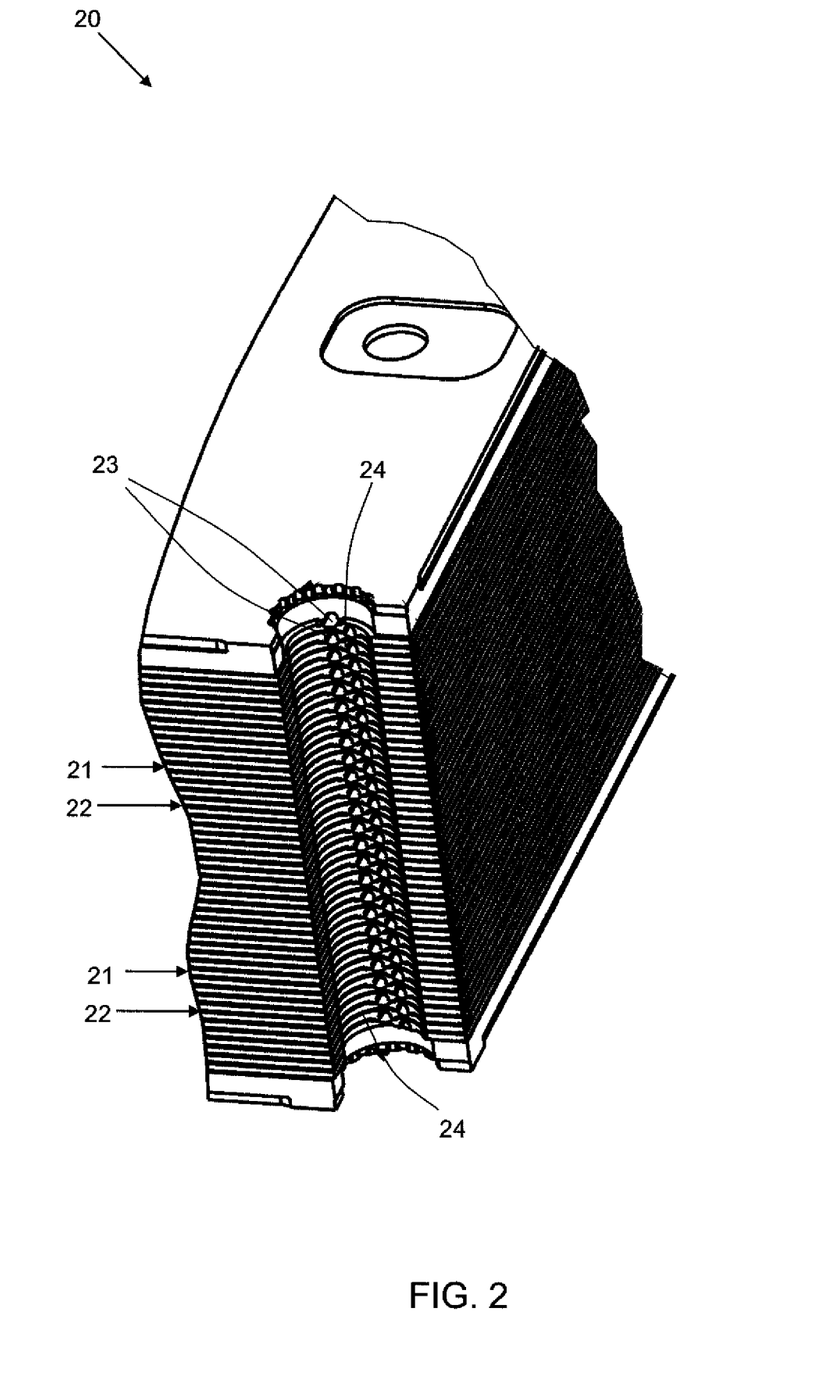
FIG. 2 is a diagram illustrating a side view of a corner of a cell stack of a flowing electrolyte battery before manufacture of an integral manifold.

Referring to FIG. 2, a diagram illustrates a side view of a corner of a cell stack 20 of a flowing electrolyte battery before manufacture of an integral manifold. It should be appreciated that similar integral manifolds will be formed at all four corners of the cell stack or at other locations on the flowing electrolyte battery.

The cell stack 20 comprises a stack of electrode plates 21 separated by separator plates 22 to define a plurality of half cells. The half cells are similar to the half cells described in the Applicant's PCT Publication No. WO2008/116248, published 2 Oct. 2008, and incorporated herein by reference. The half cells each comprise an electrode plate 21, an adjacent separator plate 22 and a capillary tube 23. The capillary tubes 23 are positioned in capillary tube channels formed between each electrode plate 21 and adjacent separator plate 22. The half cells are generally rectangular in top plan view, but have a cut-away region 24 at corners thereof. The capillary tubes 23 can be of polymeric material or any other material that is compatible for welding to injected plastic.

Figure 3:
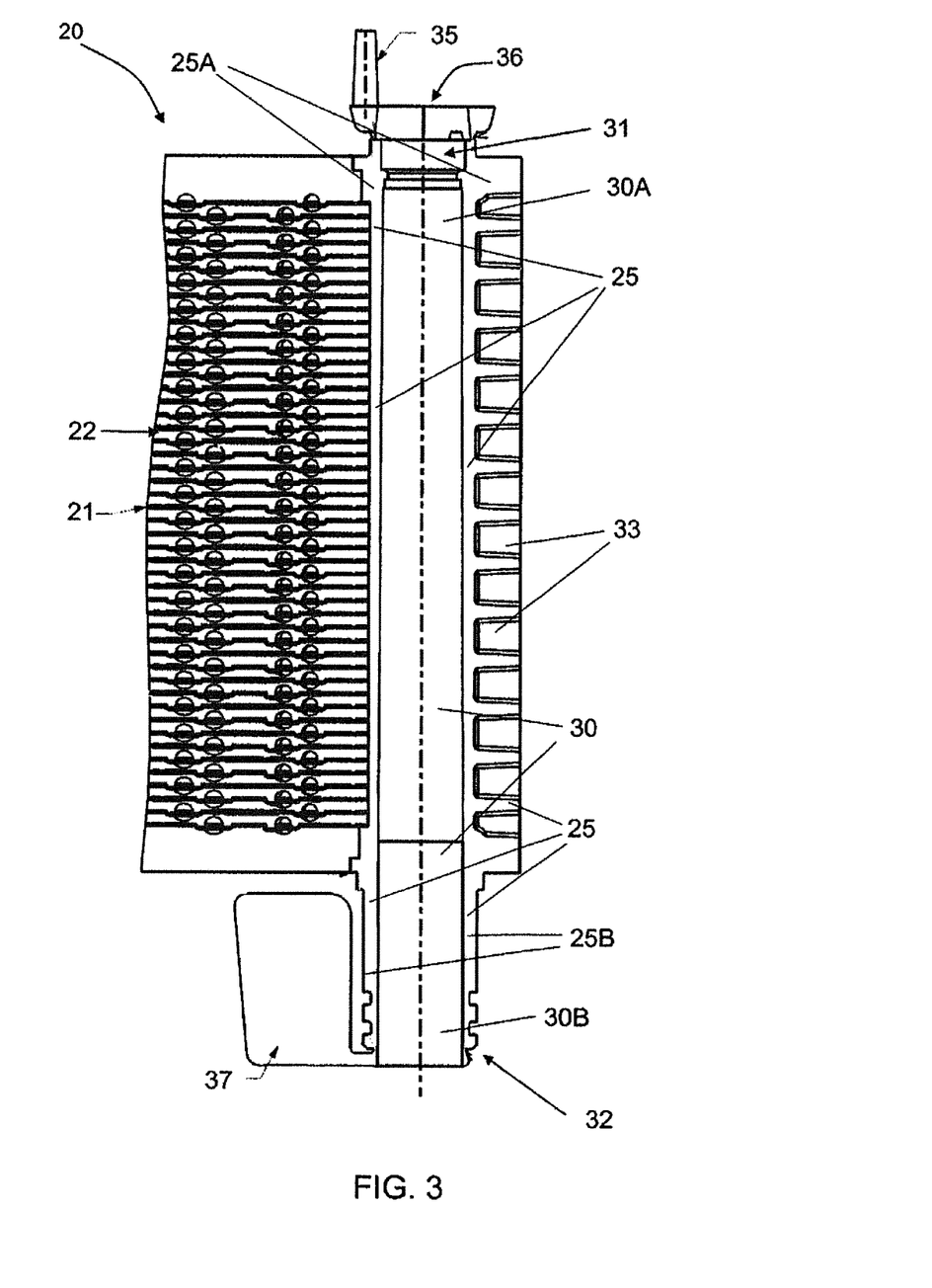
FIG. 3 is a diagram illustrating a cross-sectional side view of a corner of a cell stack during manufacture of the integral manifold according to an embodiment of the present invention.
Figure 4:
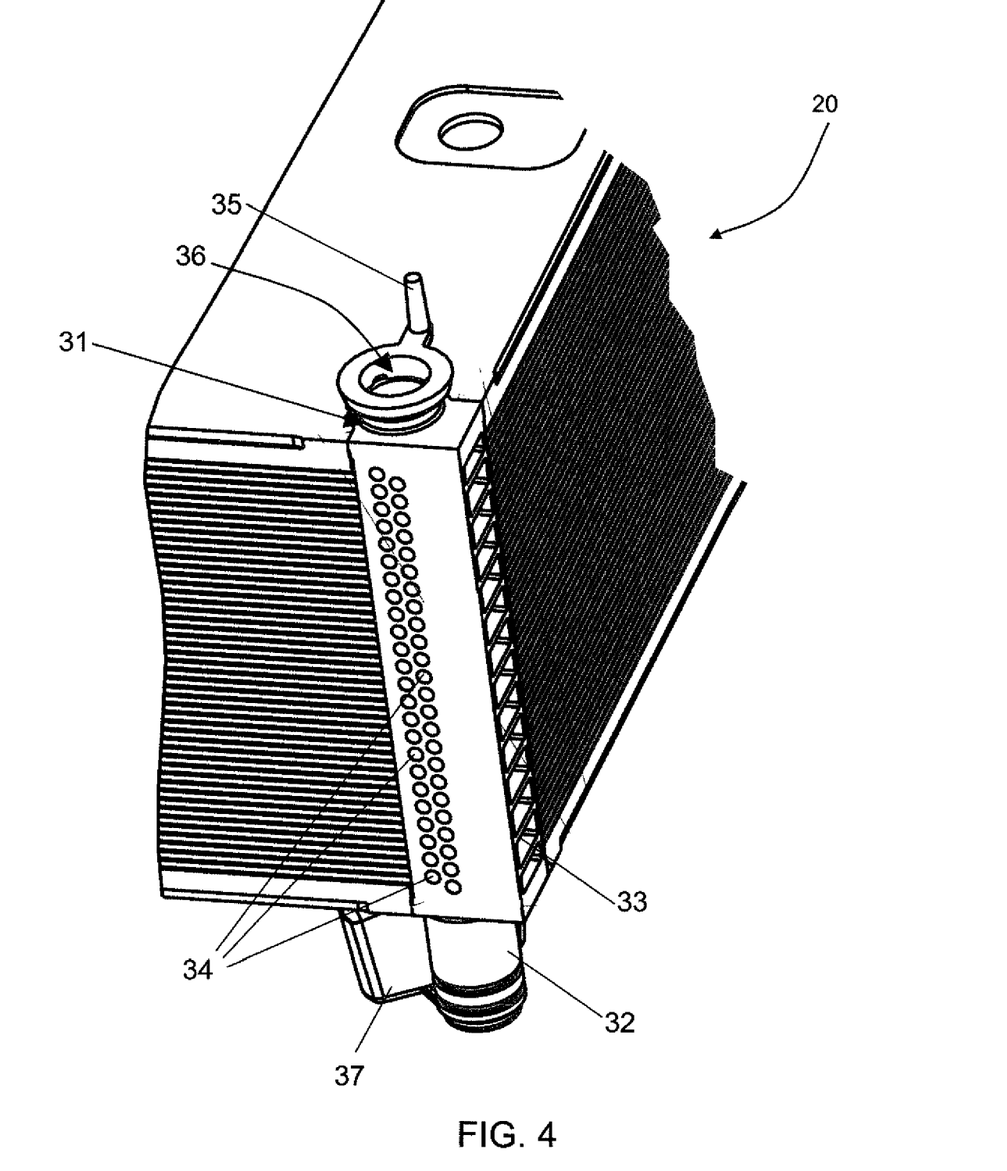
FIG. 4 is a diagram illustrating a top perspective view of the corner of the cell stack of FIG. 3.

FIG. 3 is a diagram illustrating a cross-sectional side view of a corner of a cell stack during manufacture of the integral manifold, and FIG. 4 is a diagram illustrating a top perspective view of the corner of the cell stack of FIG. 3, according to an embodiment of the present invention. Referring to FIGS. 2, 3 and 4, a manifold core 30 is positioned adjacent the cut-away regions 24, and formwork (not shown) is placed around the cell stack 20 and the manifold core 30. A space between the formwork and the manifold core 30, and a space between an edge of the cell stack 20 and the manifold core 30 define the mould cavity 25. In one embodiment the mould cavity 25 is annular in shape around the manifold core 30.

In one embodiment, the manifold core 30 is a metal tube defining a manifold cavity. However it should be appreciated that the manifold core 30 can be solid and can be made of any suitable material that does not deform in the presence of molten material. Alternatively, the manifold cavity can be formed by machining a completed mould.

The formwork may extend above and below the cell stack 20 to form an integrated top port 31 and an integrated bottom port 32 respectively. The top port 31 port is fluidly connected to a first end 30A of the manifold core 30, and the bottom port 32 is fluidly connected to a second end 30B of the manifold core 30. During use of a completed battery, the top port 31 and the bottom port 32 can be used to supply electrolyte to the cell stack 20, or to receive electrolyte from the cell stack 20. In addition, the formwork may be constructed to define a number of fins 33.

Referring to FIGS. 3 and 4, pins (not shown but identical to the pins 15) are inserted through holes 34 which extend from the openings of the capillary tubes 23 through the mould cavity 25, through the manifold core 30, and through external walls (not shown) of the formwork. Inner ends of the pins are contiguous with the openings of the capillary tubes 23 of FIG. 2, thereby closing off the tubes 23. An outer end of a pin has a larger diameter than the inner end. This arrangement is similar to the arrangement described in the Applicant's international patent application publication no. WO2010/020013, published 25 Feb. 2010 and incorporated herein by reference. The outer end of each pin is outside of the mould cavity 25 and the formwork, and an inner end of each pin is received in a respective capillary opening.

In one embodiment, a sprue 35 and a gate 36 are connected to the top port 31. The sprue 35 is fluidly connected to a first end 25A of the mould cavity 25, and the gate 36 is fluidly connected to a first end 30A of the manifold core 30. Furthermore, an overflow well 37 is connected to the bottom port 32, which is fluidly connected to a second end 25B of the mould cavity 25. The sprue 35, the gate 36 and the overflow well 37 may be made of a plastic material such that they can be trimmed after the moulding process, leaving the top port 31 and the bottom port 32 in place.

Edges of the cell stack 20 adjacent the mould cavity 25 are pre-heated by passing molten material through the mould cavity 25 and into the overflow well 37. Once the overflow well 37 is full of molten material, the mould cavity 25 is filled with the molten material. Optionally, in the case of a hollow manifold core 30, coolant fluid is simultaneously passed into the first end 30A of the manifold core 30 via the gate 36, and out of a second end 30B of the manifold core 30 to cool the pins. That can reduce the likelihood of the pins melting the capillary tubes 23. In one embodiment, the coolant fluid is air.

The molten material can be any heated polymeric material, such as polyethylene or polypropylene, that when above its melting temperature effectively bonds with the electrode plates 21 and the capillary tubes 23, as is known in the art. The molten material bonds to the exposed edges of the electrode plates 21 and forms a hermetic seal between the electrode plates 21. Further, the molten material bonds to and forms a hermetic seal around the circumference of the outer surface of each capillary tube 23 that extends out from the edges of the electrode plates 21.

Once the edges of the cell stack 20 have been sufficiently heated by the molten material filling the overflow well 37, the molten material starts to fill the mould cavity 25. It should be appreciated that the size of the overflow well 37 may be varied in order to control the amount of pre-heating. Alternatively, the second end 25B of the mould cavity 25 may be closed off by a valve in order to facilitate the filling of the mould cavity 25.

Once the molten material has set to form the mould, the pins and the formwork are removed. In addition, the manifold core 30 can be removed to form the manifold cavity. Once the pins have been removed, passages are revealed in the mould, which passages are in fluid communication with the capillary openings.

Next, the inlet sprue 35, the gate 36 and the overflow well 37 can be trimmed and removed, and the holes 34 on an outside of the integral manifold are plugged. In addition, the top port 31 of the manifold core 30 can be closed with a plug.

Figure 5:
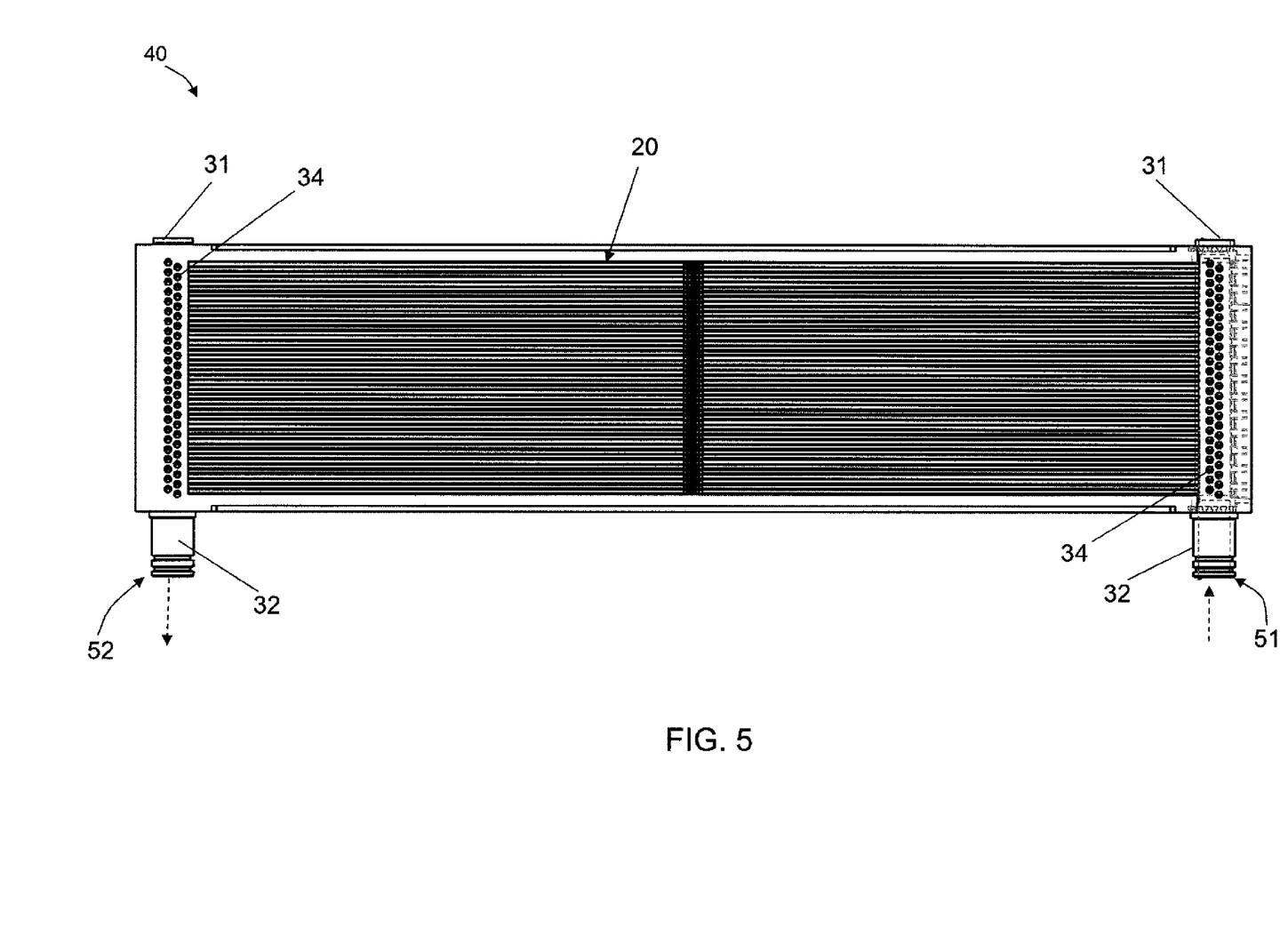
FIG. 5 is a diagram illustrating a side view of the battery, after manufacture of the integral manifold.

FIG. 5 is a diagram illustrating a side view of a battery 40, after manufacture of the integral manifold. As shown in FIG. 5 the sprue 35, gate 36 and the overflow well 37 have been removed, and the holes 34 on an outside of the integral manifold have been plugged, leaving an electrolyte inlet 51 and an electrolyte outlet 52 formed from the bottom ports 32 on opposite sides of the battery 40. As shown by dashed arrows, electrolyte passes into the battery 40 via the electrolyte inlet 51, and out of the battery 40 via the electrolyte outlet 52, or vice versa. However a person skilled in the art will appreciate that the electrolyte may pass in or out of the cell stack 20 using any suitable port 31, 32.

Because such a large part of the mould is made up of the inserted plastic parts of the cell stack 20, including the edges of the electrode plates 21 and separator plates 22, and the capillary tubes 23, and these parts include soft, low strength, and porous plastics, it may not be possible to apply sufficient pressure or temperature to bond the injected plastic to the inserted plastic parts unless the inserted plastic parts are preheated.

If the inserted plastic is preheated with hot air, the pins that seal the capillary tubes heat up as well and can melt the capillary tubes 23, causing the tubes 23 to collapse during the injection process. To prevent this problem the pins can be cooled simultaneously during the air pre-heating by using a hollow manifold where the cool air can keep the pin temperature down during the air preheating operation. Such preheating with air allows the moulding to be successful at pressures low enough that the inserted plastic parts do not deform and that the injected material does not escape past or between the inserted plastic parts.

However, an air preheating process can slow the moulding process significantly and complicate the machinery required. Therefore, a preferred method of the present invention for preheating the inserted plastic parts comprises the above-described process of injecting molten material through the mould cavity and into an overflow chamber, or out through an outlet having a valve that can be closed. Thus the injected molten material itself can be used for preheating the inserted plastic parts.

During the flow past phase, the pressure is very low, of the order of less than 10 bar. This pressure can be adjusted by changing the injection parameters of temperature, injection rate, or inlet flow restrictions, and also by changing the outlet restriction. Increasing the pressure in the mould cavity during flow past will increase heat transfer to the inserted plastic parts and reduce the volume of material that must flow past the inserted plastic parts to heat the parts to the temperature required to bond the parts adequately to the injected plastic.

Further, because the flow past phase occurs over a relatively short time period compared with air preheating, the above described pin cooling process is not necessary. As an example, effective air preheating can take from one to five minutes; whereas the flow past process can occur in a fraction of a second up to about ten seconds.

Figure 6:
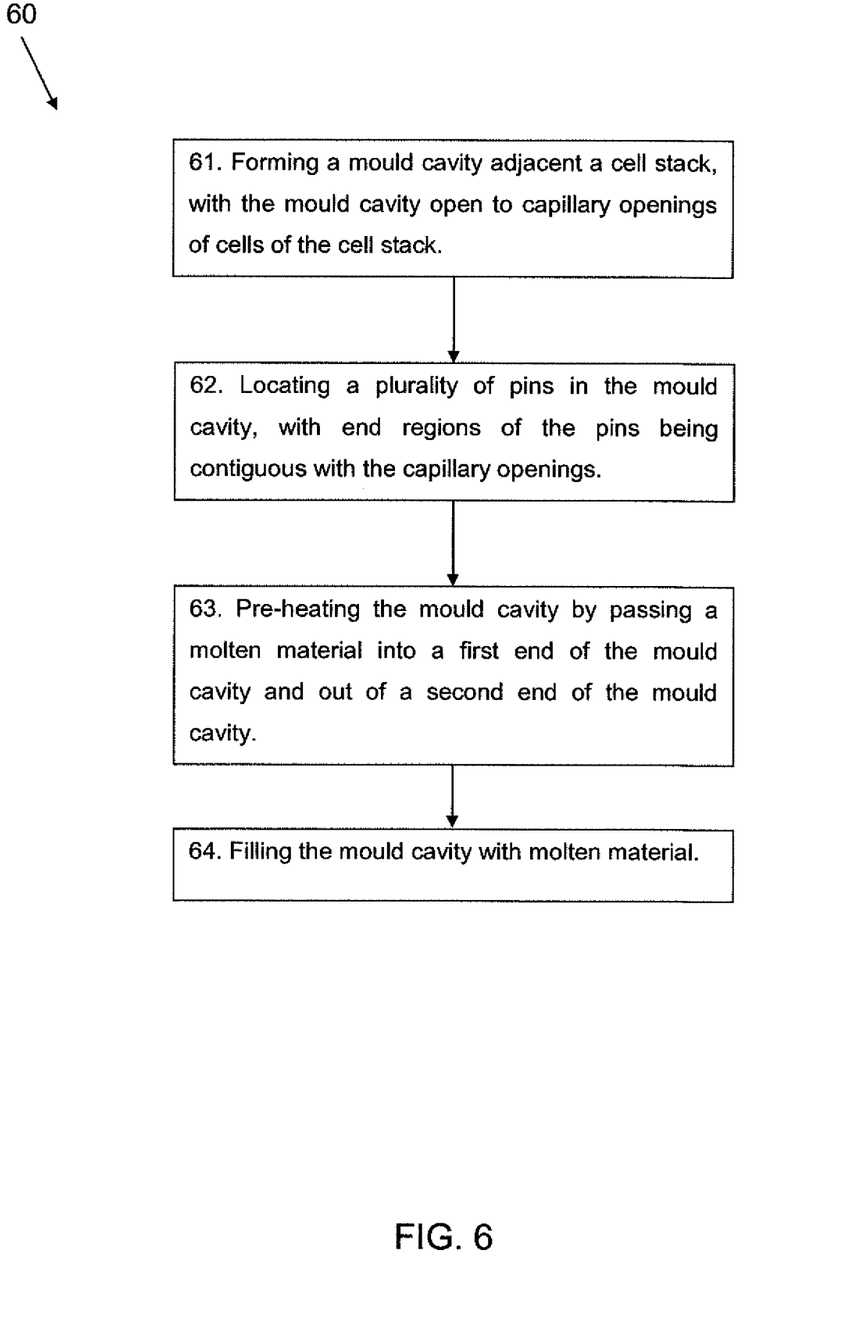
FIG. 6 is a flow diagram summarising a method of forming an integral manifold according to the present invention.

FIG. 6 is a flow diagram 60 summarising a method of forming an integral manifold according to the present invention. At step 61 a mould cavity 25 is formed adjacent a cell stack 20, with the mould cavity 25 open to capillary openings 23 of cells of the cell stack 20. At step 62, a plurality of pins are located in the mould cavity 25, with end regions of the pins being contiguous with the capillary openings. At step 63, the mould cavity is pre-heated by passing a molten material into a first end 25A of the mould cavity 25 and out of a second end 25B of the mould cavity 25. Finally at step 64, the mould cavity 25 is filled with molten material.

The amount of flow past preheating can also be adjusted by varying the amount of material that is allowed to flow through the mould cavity 25. This can be done by adjusting the chamber volume of the overflow well 37 or adjusting the timing of the closing of the valve (not shown) positioned at the second end 25B of the mould cavity 25. When the overflow well 37 is full, or the valve is closed, then the pressure in the mould cavity 25 increases and fills completely any parts or voids that had not filled during the overflow process. Using this method the pressure inside the mould cavity 25 during injection of the molten material can be 30 bar or as low as 20 bar if sufficient preheating is used.

Advantages of the present invention include an ability to pre-heat the edges of the cell stack by passing molten material through the mould cavity, which enables improved bonding of the molten material to the edges of the cell stack and to the capillary tubes. Furthermore, the electrolyte inlet and the outlet are integrally formed with the manifold core, which reduces further the likelihood of leaks. Yet a further advantage is that, due to the integrally formed electrolyte inlet and outlet, a height of the battery can be reduced.

Also, by preheating the inserted plastic parts of the cell stack, lower injection temperatures than the temperatures used for standard insert moulding are possible, while still obtaining a good bond between injected material and the inserted parts. If high injection temperatures are used, the lower viscosity of the injected plastic makes sealing the inserted parts more difficult and leaks of injected material between or past the inserted parts can occur.

Further, fast preheating means that higher pressures and temperatures are possible. If hot air preheating is used, the longer heating time can not only preheat the surface of the inserted parts, but also heat deeper into those parts. This can cause the parts to lose strength and stiffness and reduce the maximum injection pressure possible before the parts deform of allow injected material to leak. Because of the higher initial strength and stiffness of the inserted parts, higher injection temperatures can be used if preheating occurs quickly such as with flow past preheating. The higher pressure and temperature allow for improved filling of the rest of the mould cavity, and also reduce the amount of shrinkage and hence improve the dimensional tolerances of the finished part upon cooling.

Still further, the process of flowing molten material through the mould cavity has the added benefit of cleaning the exposed surfaces of the inserted plastic parts of oxides or foreign contamination which, if present, make bonding more difficult. Preheating with air for example generally does not remove these contaminants.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. This patent specification is intended to embrace all alternatives, modifications and variations of the present invention that have been discussed herein, and other embodiments that fall within the spirit and scope of the above described invention.

The invention claimed is:

1. A method of forming an integral manifold adjacent a cell stack of a flowing electrolyte battery, the method including:
   defining a mould cavity adjacent the cell stack, with the mould cavity open to capillary openings of half cells of the cell stack, and wherein the mould cavity is defined as a space between a formwork, a manifold core positioned inside the mould cavity to define a manifold cavity, an edge of a cell stack, and a plurality of pins, wherein the plurality of pins pass through the manifold core;
   locating the plurality of pins in the mould cavity, with end regions of the pins being contiguous with the capillary openings;
   extending formwork above the cell stack to form a top port and extending formwork below the cell stack to form a bottom port;
   pre-heating the mould cavity by passing a first molten material into a first end of the mould cavity and out of a second end of the mould cavity; and
   after pre-heating the mould cavity, filling the mould cavity with a second molten material.

2. The method of claim 1, further comprising:
   cooling the pins.

3. The method of claim 1, further comprising passing coolant fluid into a first end of the manifold core and out of a second end of the manifold core to cool the plurality of pins.

4. The method of claim 1, wherein the first molten material used during pre-heating is the same material as the second molten material used during filling the mould cavity.

5. The method of claim 1, wherein a sprue and a gate are connected to the top port.

6. The method of claim 5, wherein the sprue is fluidly connected to the mould cavity and the gate is fluidly connected to the manifold cavity.

7. The method of claim 6, wherein an overflow well or a valve is connected to to the second end of the mould cavity.

8. The method of claim 7, further comprising:
   passing coolant fluid through the gate and into a first end of the manifold core and out of a second end of the manifold core to cool the plurality of pins; and
   wherein passing the first molten material into the first end of the mould cavity and out of the second end of the mould cavity comprises passing the first molten material into the sprue, through the mould cavity, and into the overflow well.

9. The method of claim 8, wherein passing coolant fluid through the gate and into a first end of the manifold core and out of a second end of the manifold core is performed simultaneously with passing the first molten material into the first end of the mould cavity and out of the second end of the mould cavity.

10. The method of claim 1, wherein a pressure inside the mould cavity does not exceed 10 bar during pre-heating the mould cavity.

11. The method of claim 1, wherein a pressure inside the mould cavity does not exceed 30 bar during filling the mould cavity with the second molten material.

12. The method of claim 1, wherein during pre-heating the molten material passes out of the second end of the mould cavity for less than ten seconds.

13. The method of claim 1, further comprising:
   cutting a sprue or gate from the first end of the mould cavity; and
   cutting an overflow well from the second end of the mould cavity.

14. An integral manifold for a flowing electrolyte battery formed in accordance with the method of claim 1.

* * * * *